United States Patent [19]
Okuwaki et al.

[11] Patent Number: 4,795,409
[45] Date of Patent: Jan. 3, 1989

[54] CONTINUOUS BELT OF A CONTINUOUSLY VARIABLE TRANSMISSION

[75] Inventors: Shigeru Okuwaki, Susono; Susumu Ohkawa, Aichi; Yasunobu Jufuku, Gotenba; Yuudai Tatara, Susono, all of Japan

[73] Assignee: Toyota Jidosha Kabushiki Kaisha, Aichi, Japan

[21] Appl. No.: 126,720

[22] Filed: Nov. 30, 1987

[30] Foreign Application Priority Data

Dec. 11, 1986 [JP] Japan .................................. 61-293509

[51] Int. Cl.⁴ ............................................... F16G 1/24
[52] U.S. Cl. ...................................... 474/245; 474/201
[58] Field of Search ............... 474/237, 240, 242, 244, 474/245, 201, 212–217; 59/5, 7, 84, 88

[56] References Cited

U.S. PATENT DOCUMENTS 4,569,671  2/1986  Ledvina ............................. 474/201
4,655,735  4/1987  Sakakibara et al. ................. 474/245

FOREIGN PATENT DOCUMENTS

59-30935    7/1984  Japan .
59-226729  12/1984  Japan .
60-18638    1/1985  Japan .

Primary Examiner—Thuy M. Bui
Attorney, Agent, or Firm—Parkhurst, Oliff & Berridge

[57] ABSTRACT

A continuous belt of a continuously variable transmission for transmitting a driving torque from an input pulley to an output pulley includes a plurality of blocks, links and pins. Each block includes first and second side engagement surfaces. When the continuous belt spans between the input and output pulleys, at least two different engagement points are defined between the blocks and the pulley. Each link includes first and second end portions, an intermediate portion, first and second connecting holes, an outer projection and an inner projection. The first and second connecting holes are defined within the first and second end portions. The outer projection projects from the first and end portion toward a lateral direction of the continuous belt. The inner projection projects from the first end portion in a direction opposite the direction of the outer projection. Each link has a pitch line of the link which passes through center points of the first and second connecting holes. A center line of each link passes equidistant between the outer and the inner projections. The pitch line is parallel to and spaced apart from the center line. The links are inserted into the blocks such that the outer projection of the links are positioned toward the inside of the continuous belt in one of at least two engagement points between the blocks and the pulley and the inner projection of the links are positioned toward the inside of the continuous belt in the other of at least two engagement points.

20 Claims, 10 Drawing Sheets

CONTINUOUS BELT OF A CONTINUOUSLY VARIABLE TRANSMISSION

BACKGROUND OF THE INVENTION

The present invention relates to a V-shape belt for transmitting driving force in a continuously variable transmission of an automobile.

More particularly, the present invention relates to improvements in a V-shape belt comprising a plurality of links and a plurality of V-shape blocks. Each link includes forward and backward ends, and the forward end of one link is rotatably connected to the backward end of an adjacent link by a pin.

Each V-shape block engages with at least one link, so that a continuous V-shape loop is formed. The V-shape loop engages with pulleys, and the V-shape loop transmits driving force from one pulley to another pulley. A conventional V-shape loop is disclosed in a copending application (Ser. No.: 11,336, filed on Feb. 5, 1987 now U.S. Pat. No. 4,767,333).

Also a similar V-shape loop is disclosed in Japanese Patent application Laid open Sho No. 59-226729. The V-shape block includes an opening for engaging with at least one link.

When the V-shape loop is spanned between pulleys, several V-shape blocks engage with grooves of the pulleys, and the other V-shape blocks are free and apart from the pulleys.

When the pulleys are rotated, the free V-shape block engages with the V-shape grooves of the pulley at intervals of a constant time period according to the rotational speed of the V-shape loop, and this engagement makes noise at the time of each engagement. Such noise is called pitch noise and the frequency of the noise is calculated by a formula as follows:

frequency of the noise=rotational speed of the V-shape belt÷block pitch.

To prevent the pitch noise, the V-shape block of the conventional continuously variable transmission includes different shapes on contacting edges thereof, which engage with the V-shape grooves of the pulleys. Further, the different shapes of the contacting edges of V-shape blocks are arranged at random in the longitudinal direction of the V-shape belt. Accordingly, radial positions for engagement between the V-shape blocks and the V-shape grooves of the pulleys are irregularly varied. As a result, the time period for engagement between the V-shape blocks and the V-shape grooves of the pulleys is irregularly varied. Therefore, a peak of noise in a specific frequency is lowered, because frequency distribution is leveled.

However, the conventional V-shape belt needs at least two types of blocks which include different shaped contacting edges of the V-shape blocks in order to reduce the noise level.

SUMMARY OF THE INVENTION

The present invention was developed in view of the foregoing background and to overcome the foregoing drawbacks. It is accordingly an object of this invention to provide a V-shape belt for transmitting driving force of a continuously variable transmission.

To reduce noise level, a continuous belt of a continuously variable transmission for transmitting a driving torque from an input pulley to an output pulley includes a plurality of block means, link means and pin means. Each block means includes an opening, a pair of side engagement surfaces and at least a beam. When the continuous belt spans between the input and output pulleys, at least two engagement points are defined between at least two block means and the pulley.

Each link means includes first and second end portions, an intermediate portion, first and second connecting holes, an outer projection and an inner projection. The intermediate portion is defined between the first and second portions. The first and second connecting holes are defined within the first and second end portions, respectively. The outer projection projects from the first end portion toward a lateral direction of the continuous belt. The inner projection projects from the first end portion in a direction opposite the direction of against the outer projection. The intermediate portion is inserted into the opening of the block means. At least one of the first and second projections engages with the beam of the V-shape block. A pitch line of the link means passes through center points of the first and second connecting holes. A center line of the link passes equidistant between the outer projection and the inner projection. The pitch line is parallel to and spaced apart from the center line. The link means are arranged such that in certain block means the outer projection faces the inside of the continuous belt, and in other block means the inner projection faces the inside of the continuous belt. The sequence along the continuous belt of the various block means is randomly varied such that the distribution of inward facing outer and inner projections varies randomly. Each pin means is inserted into the connecting holes of the plurality of link means. Each pin means connects at least another of the plurality of link means with at least another of the plurality of link means.

Accordingly, radial engagement points between the block means and the pulleys are irregularly varied. As a result, the time periods for engagements between the block means and the pulleys are irregularly varied. Further, a peak of noise in a specific frequency is lowered, because frequency distribution is leveled. Moreover, two types of blocks are not required to achieve the desired reduction in peak noise.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements.

DETAILED DESCRIPTION OF THE PREFERRED EMBODIMENTS

The present invention will be described in detail with reference to the accompanying drawings which illustrate different embodiments according to the present invention.

Figure 1:
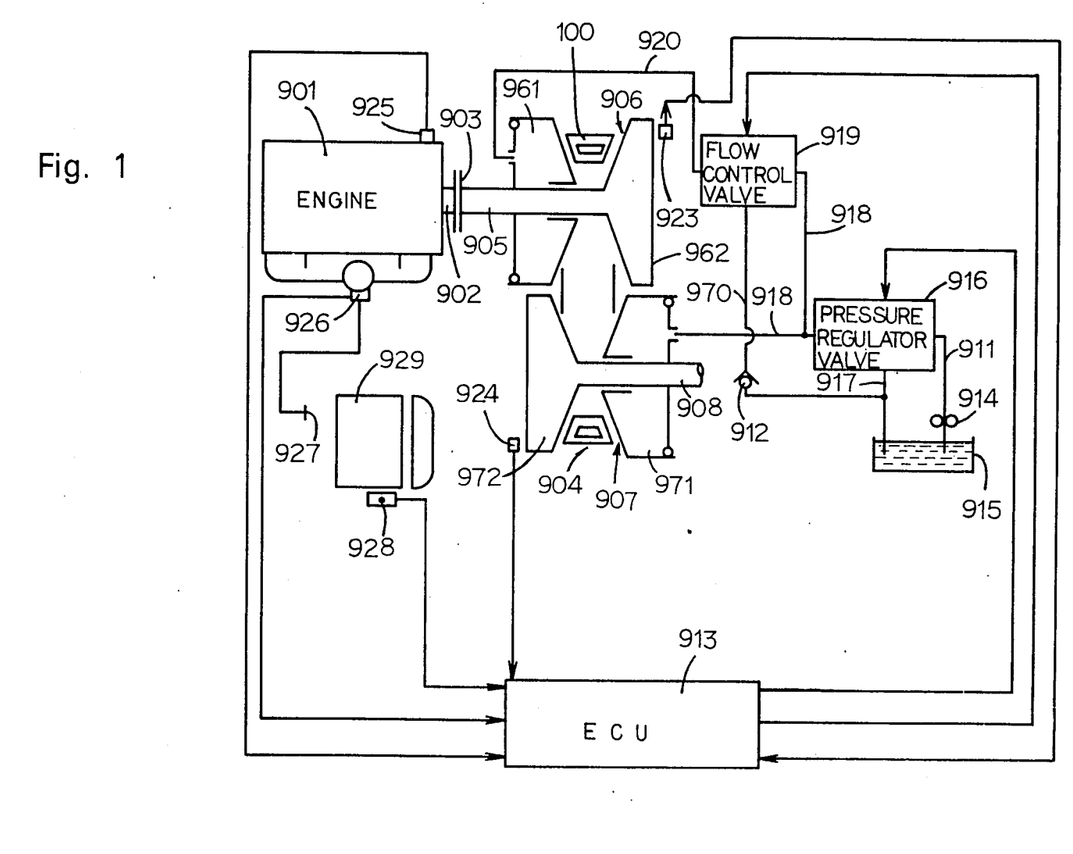
FIG. 1 is a schematic view of a continuously variable transmission.

Referring to FIG. 1, an engine 901 includes an output shaft 902 which is connected to an input shaft 905 of a continuously variable transmission 904 (hereinafter, "CVT" represents the continuously variable transmission) through a clutch 903. Accordingly, the input shaft 905 of the CVT 904 is driven by the engine 901.

Figure 3:
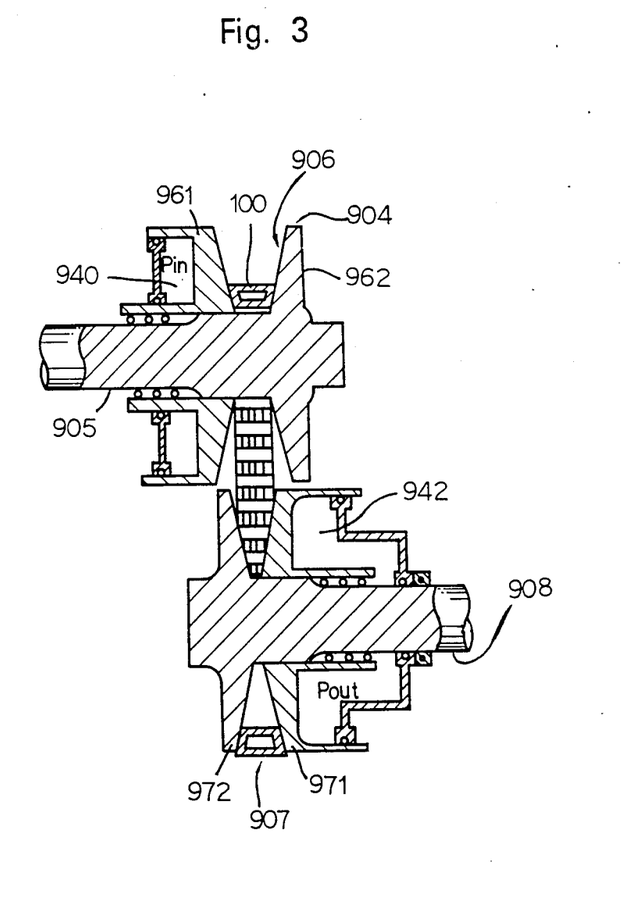
FIG. 3 is an enlarged cross-sectional view of the continuously variable transmission.

The CVT 904 includes an input pulley 906 and an output pulley 907. The input pulley 906 is connected to the input shaft 905. The input pulley 906 includes a first movable member 961 and a first non-movable member 962. A V-shape groove is defined between the first movable and non-movable members 961 and 962. The first movable member 961 is axially displaceable on and rotates with the input shaft 905. As shown in FIG. 3, a first hydraulic cylinder 940 is defined within the first movable member 961 and the pressure "$P_{in}$" is exerted in the first hydraulic cylinder 940. The first movable member 961 is axially displaced by the pressure "$P_{in}$" in the first hydraulic cylinder 940. Oil is supplied to the first hydraulic cylinder 940 and the amount of the oil is controlled by a flow control valve 919. The flow control valve 919 is connected to the first hydraulic cylinder 940 through a first oil passage 920.

Accordingly, when the amount of the oil applied to the first hydraulic cylinder 940 is increased, the first movable member 961 is axially displaced in a direction toward the first non-movable member 962. As a result, a space, defined between the first movable and non-movable members 961 and 962, is decreased and an effective diameter of the input pulley 906 is increased. On the other hand, the output pulley 907 is connected to an output shaft 908. The output pulley 907 includes a second movable member 971 and a second non-movable member 972. A V-shape groove is defined between the second movable and non-movable members 971 and 972. The second movable member 971 is axially displaceable on and rotates with the output shaft 908. As shown in FIG. 3, a second hydraulic cylinder 942 is defined within the second movable member 971 and the pressure "$P_{out}$" is exerted in the second hydraulic cylinder 942. The second movable member 971 is axially displaced by the pressure "$P_{out}$" in the second hydraulic cylinder 942. The second hydraulic cylinder 942 is connected to a pressure regulator valve 916 through a second oil passage 918. The pressure "$P_{out}$" in the second hydraulic cylinder 942 is controlled by the pressure regulator valve 916.

Accordingly, when the amount of the oil in the second hydraulic cylinder 942 is increased, the second movable member 971 is axially displaced in a direction toward the second non-movable member 972. As a result, a space, defined between the second movable and non-movable members 971 and 972, is decreased and an effective diameter of the output pulley 907 is increased.

Further, the second oil passage 918 diverges and the flow control valve 919 communicates with the pressure regulator valve 916 through the second oil passage 918.

The pressure regulator valve 916 communicates with a reservoir 915 through a third oil passage 911. A hydraulic fluid pump 914 is connected to the third oil passage 911 and the hydraulic fluid pump 914 pumps hydraulic fluid from the reservoir 915 to the pressure regulator valve 916. The hydraulic fluid pump 914 is driven by a motor and consumes engine power.

The pressure regulator valve 916 controls the pressure of the fluid applied to the second oil passage 918. The flow control valve 919 is a three port connection valve, and includes an inlet port in communication with the second oil passage 918, a drain port in communication with a drain passage 970 and an outlet port in communication with the first oil passage 920. When the flow control valve 919 is in a first position, the inlet port communicates with the outlet port. When the flow control valve 919 is in a second position, the inlet port does not communicate with the outlet port, and there is no communication among the three ports. When the flow control valve 919 is in a third position, the outlet port communicates with the drain port. A check valve 912 is provided on the drain passage 970. The check valve 912 only allows hydraulic fluid to flow in a single direction, from the flow control valve 919 to the hydraulic fluid reservoir 915. The pressure regulator valve 916 communicates with the hydraulic fluid reservoir 915 through a second drain passage 917.

A V-shape belt 100 extends between the input and output pulleys 906 and 907. Accordingly, the torque of the input pulley 906 is transmitted to the output pulley 907 through the V-shape belt 100. Further, the torque of the output shaft 908 is outputted to wheels (not shown in drawings).

The hydraulic pressure "$P_{in}$" of the first hydraulic cylinder 940 is varied to adjust a RPM ratio "e". The RPM ratio "e" is calculated by a first formula as follows:

$$\text{RPM ratio "e"} = \text{RPM}_{out}/\text{RPM}_{in} \quad (1),$$

wherein $\text{RPM}_{out}$ represents a rotational speed of the driven pulley 907 and $\text{RPM}_{in}$ represents a rotational speed of the driving pulley 906.

Accordingly, when the amount of the oil applied to the first hydraulic cylinder 940 is increased the RPM ratio "e" is increased. Conversely, when the amount of the oil applied to the first hydraulic cylinder 940 is decreased, the RPM ratio "e" is decreased.

To minimize the amount of engine power consumed by the hydraulic fluid pump 914, the hydraulic pressure "$P_{out}$" in the second hydraulic cylinder 942 is controlled to be as low as possible.

Further, the hydraulic pressure "$P_{in}$" per an area in the first hydraulic cylinder 940 is designed to be less than the hydraulic pressure "$P_{out}$" per an area in the second hydraulic cylinder 942. However, the total pressure applied to the second movable member 971 of the output pulley 907 is less than a total pressure applied to the first movable member 961 of the input pulley 906 because the first hydraulic cylinder 940 has a larger area than that of the second hydraulic cylinder 942.

Hence, it is possible to obtain the RPM ratio "e" of greater than or at least equal to one.

The RPM ratio "e" is controlled by an electronic control unit (hereinafter ECU represents the electronic control unit) 913. The ECU 913 receives output signals from first through fifth sensors 923 through 926 and 928.

The first sensor 923 detects the rotational speed $RPM_{in}$ of the input pulley 906. The second sensor 924 detects the rotational speed $RPM_{out}$ of the output pulley 907. The third sensor 925 is mounted adjacent a cylinder block of the engine 901 and detects the temperature of the engine coolant. The fourth sensor 926 detects an amount of a throttle opening of a throttle valve, which is varied in proportion to a stroke of an accelerator pedal 927. The fifth sensor 928 is mounted near a passenger seat 929 and detects the position of a shift lever of the transmission. The ECU 913 outputs a control signal to the pressure regulator valve 916 and the flow control valve 919.

Figure 2:
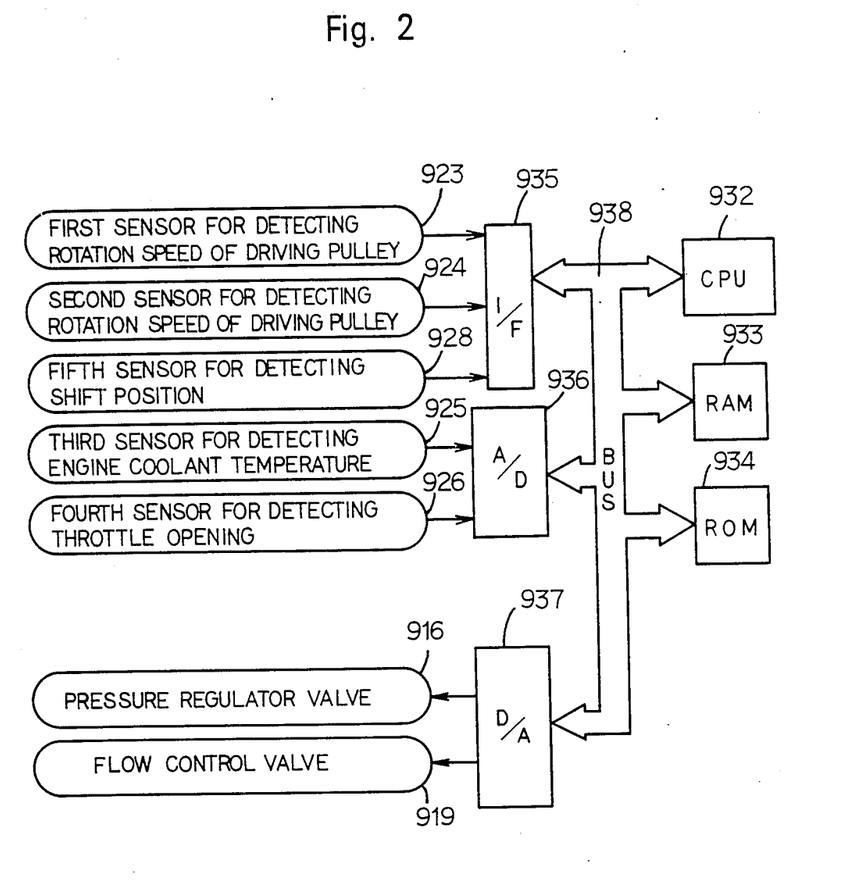
FIG. 2 is a circuit diagram of an electronic control unit.

As a result, the ECU 913 controls the pressure regulator valve 916 and the flow control valve 919 in accordance with the output signals detected by the first through fifth sensors 923 through 926 and 928. The ECU 913 includes a central processing unit (hereinafter CPU represents the central processing unit) 932 which carries out arithmetic and logic processing functions, an inter-face (hereinafter I/F represents the inter-face) 935, an analog-digital converter (hereinafter A/D represents the analog-digital converter) 936, a random-access memory (hereinafter RAM represents the random-access memory) 933 which temporarily stores the calculated data of the CPU 932, a read-only memory (hereinafter ROM represents the read-only memory) 934 which stores a predetermined control program and arithmetic constants therein, and a digital-analog converter (hereinafter D/A represents the digital-analog converter) 937. They are connected by a common bus 938. The I/F 935 receives the output signal from the first sensor 923 corresponding to the rotational speed of the input pulley 906 "$RPM_{in}$", the output signal from the second sensor 924 corresponding to the rotational speed of the output pulley 907 "$RPM_{out}$" and the output signal from the fifth sensor 928. The A/D 936 receives the output signals from the third sensor 925 and the fourth sensor 926. The CPU 932 compares the output signals with stored information, and outputs output signals to the D/A 937. The ROM 934 works in conjunction with the CPU 932. The ROM 934 stores a data map, which includes the RPM ratios "e", and the desired engine speed. The CPU 932 compares the actual operating conditions with the data stored in the ROM 934, and outputs an output signal which controls the regulator valve 916 and the flow control valve 919.

Figure 4:
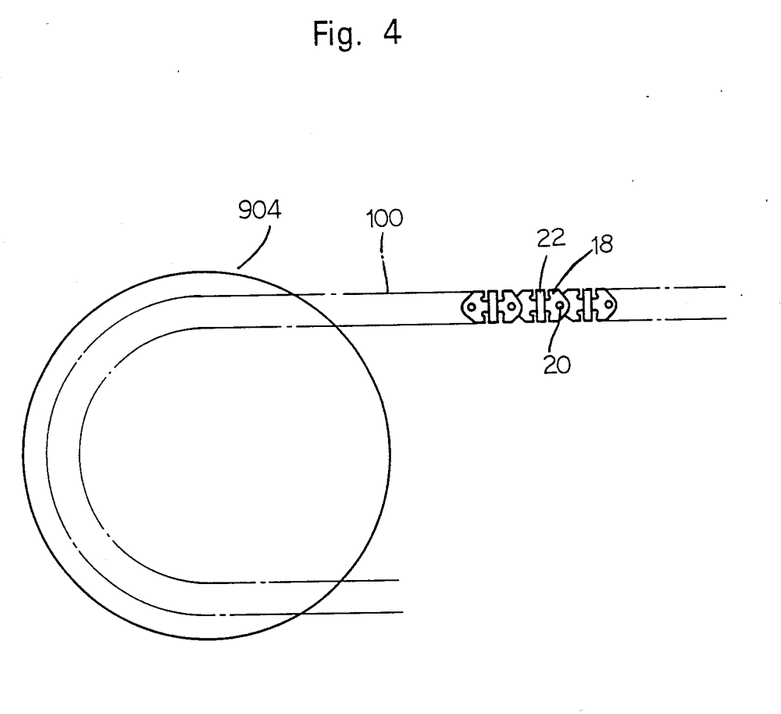
FIG. 4 is an enlarged side view of a portion of a continuously variable transmission, wherein a V-shape belt spans between the input and output pulleys.

As shown in FIG. 4, the V-shape belt 100 includes a plurality of V-shape blocks 22, a plurality of first links 18 and a plurality of pins 20. In an assembled condition, the plurality of links 18 and the plurality of pins 20 function as a connecting means.

Figure 5:
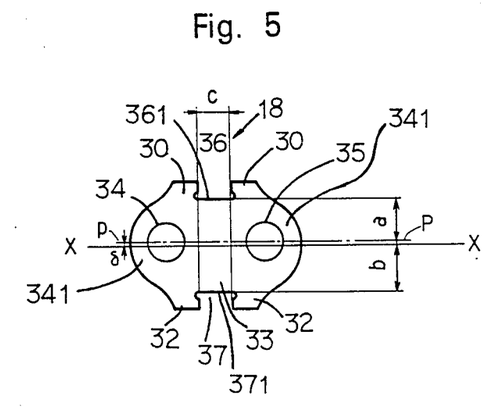
FIG. 5 is a side view of a link of the V-shape belt.

As shown in FIG. 5, the link 18 includes opposite ends 341, an intermediate portion 33, first projections 30 and second projections 32. A first recess 36 is defined between the first projections 30 and a second recess 37 is defined between the second projections 32. A distance "c" is defined between the first projections 30 or between the second projections 32. The first recess 36 is positioned at an opposite side of the second recess 37. The first and second recesses 36 and 37 include, respectively, bottom surfaces 361 and 371. A connecting hole 34 or 35 is defined between the first and second projections 30 and 32. A line X—X represents a center line of the link 18, so that the distance between the bottom surface 361 and the center line X—X is equal to the distance between the bottom surface 371 and the center line X—X. A line P—P represents a pitch line of the link 18, so that the pitch line P—P passes through center points of the connecting holes 34 and 35. The pitch line P—P is spaced apart from the first bottom surface 361 by a distance "a", and is also spaced apart from the second bottom surface 371 by a distance "b". Accordingly, the pitch line P—P is parallel to the center line X—X and the pitch line P—P is spaced apart from the center line X—X by a distance "δ".

Figure 6:
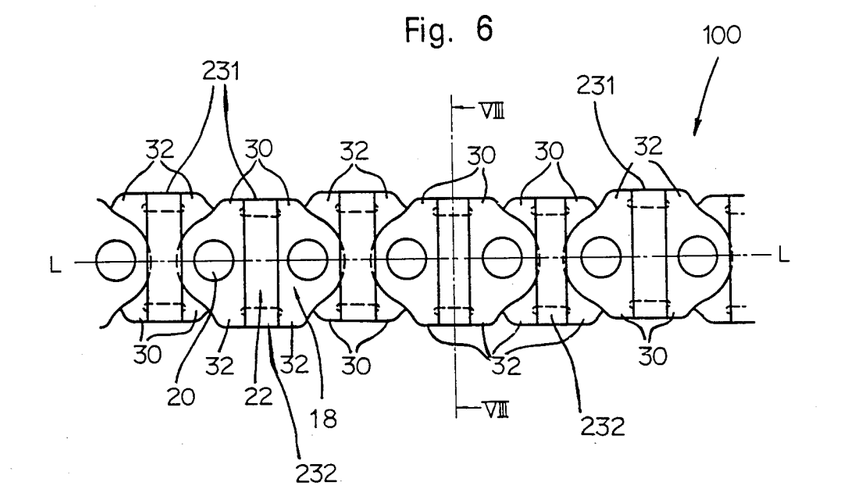
FIG. 6 is a side view of a portion of the V-shape belt.
Figure 7:
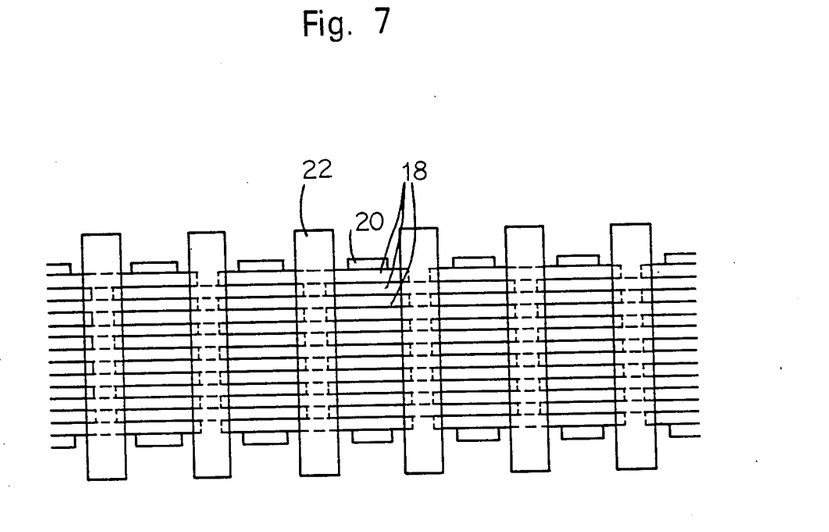
FIG. 7 is an upper view of the portion of the V-shape belt.

As shown in FIGS. 6 and 7, the pin 20 connects the links 18 rotatably to each other, and the V-shape blocks 22 are mounted within the first and second recesses 36 and 37.

Figure 9:
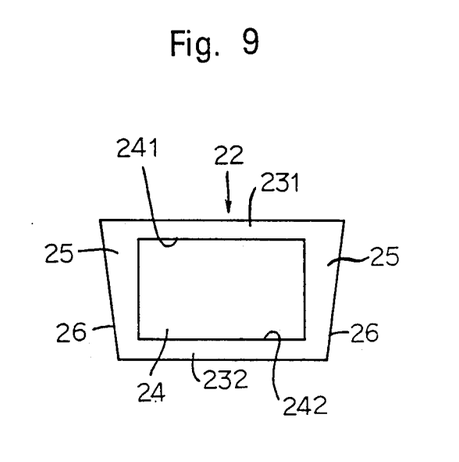
FIG. 9 is a front view of a V-shape block of the V-shape belt.
Figure 10:
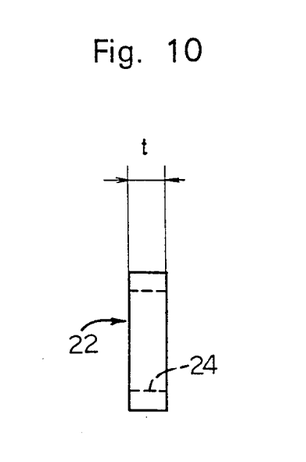
FIG. 10 is a side view of the V-shape block.

As shown in FIGS. 9 and 10, the V-shape block 22 includes an outer beam 231, an inner beam 232 and two side columns 25. An opening 24 is defined by the outer and inner beams 231 and 232 and the side columns 25.

A thickness "t" of the V-shape block 22 is the substantially same as the intervals "C" of the first and second recesses 36 and 37. When the V-shape belt 100 is spanned between the input and output pulleys 906 and 907, the outer beam 231 is positioned at the outer side in the radial direction of the pulleys 906 and 907, and the inner beam 232 is positioned at the inner side in the radial direction of the pulleys 906 and 907. As shown in FIG. 6, when the V-shape belt 100 is assembled and spanned between pulleys 906 and 907, all of the outer beams 231 face to the outer side of the loop of the V-shape belt 100, and all of the inner beams 232 face to the inside of the loop of the V-shape belt 100. However, some of the first and second projections 30 and 32 face to the outer side of the loop, and some of them 30 and 32 face to the inside of the loop. The first projections 30 are arranged at random with the second projections 32.

Accordingly, there are some blocks having first projections 30 and some blocks having second projections 32 directed toward the inner surface of the V-shape belt 100. As a result, an inner distance defined between the inner surface of the V-shape belt 100 and a center line L—L of the V-shape belt 100 is varied. When the V-shape belt is assembled in this manner the first projection 30 is recessed with respect to the second projection 32 by a distance "2δ" (i.e., the center points of the connecting holes 34 and 35 of the link 18 are apart from the center line X—X of the link 18 by the distance "δ"). Therefore, a radial distance of engagement of the V-shape block 22 with the first projection 30, with the pulley 906 or 907 is longer for certain block means by the distance "2δ".

As a result, when the V-shape belt 100 is rotated, the radial distances of the engagement between the V-shape blocks 22 of the V-shape belt 100 and the pulleys 906 and 907 vary randomly. Consequently, time periods, defined between the engagement and the next engagement of the V-shape blocks 22 of the V-shape belt 100 with the pulleys 906 or 907 vary (i.e., the frequency of the noise caused by the engagements is not concentrated at a constant frequency, and the frequency of the noise is leveled). Thus, the noise is reduced.

Figure 8:
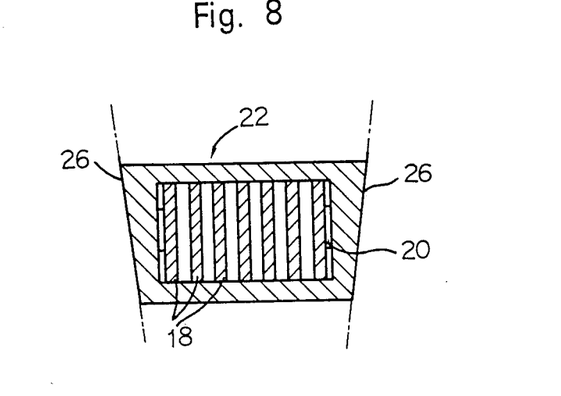
FIG. 8 is a cross-sectional view of the V-shape belt taken along the line VIII—VIII in FIG. 6.

As shown in FIG. 8, both contacting surfaces 26 of the V-shape blocks 22 contact with the pulleys 906 and 907, and the V-shape blocks 22 transmit the driving torque to the links 18 from the input pulley 906 to the output pulley 907.

Figure 11:
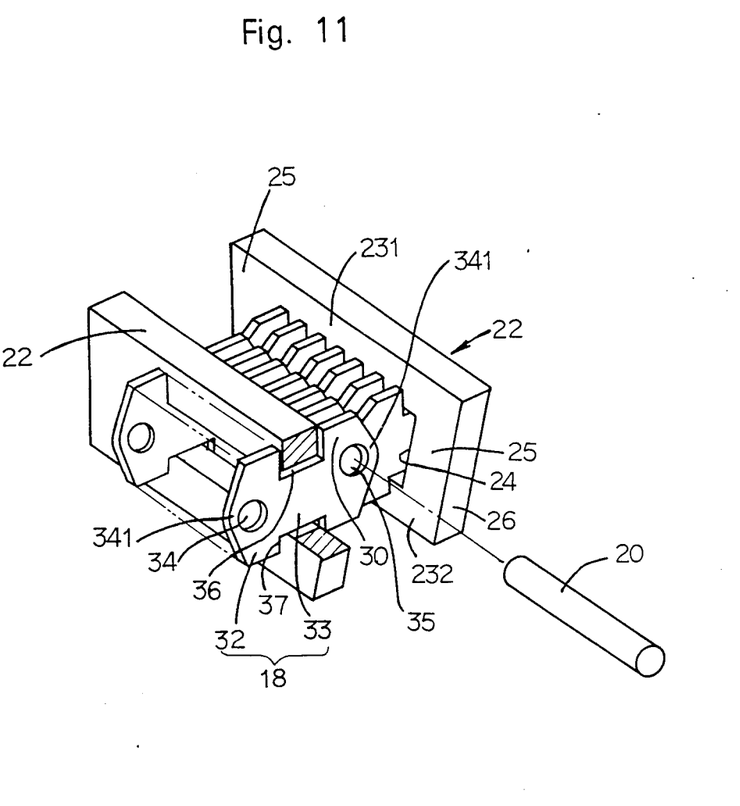
FIG. 11 is a perspective view of a portion of the V-shape belt.

As shown in FIG. 11, a side surface of the end 341 of the link 18 contacts with a side surface of the end 341 of the other link 18. Pin 20 is inserted into the connecting holes 34 and/or 35 of the links 18. Further, the intermediate portion 33 of the link 18 is separated from the intermediate portion 33 of the next located link 18 by a thickness of the sandwiched link 18 in the lateral direction of the link 18. The arranged links 18 are inserted into the opening 24 of the V-shape block 22, and the pin 20 connects the arranged links 18 to each other. As a result, an inside surface 241 of the outer beam 231 and an inside surface 242 of the inner beam 232 contact with the bottom surfaces 361 and 371 of the links 18, and a continuous loop V-shape belt is formed. Further, in the assembled condition, the front face and a rear face of the outer and inner beams 231 and 232 engage with the first and second projections 30 and 32 of the link 18.

Figure 12:
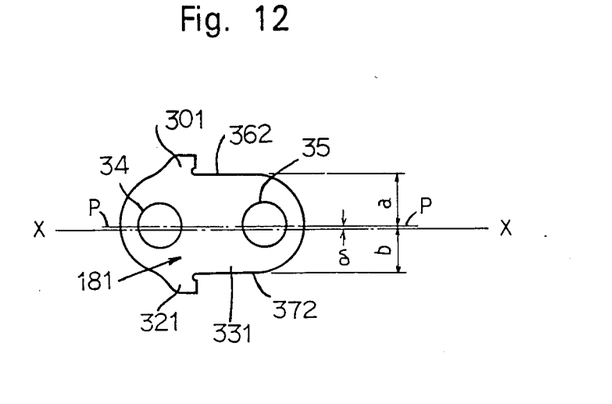
FIG. 12 is a side view of the link of a second embodiment.
Figure 13:
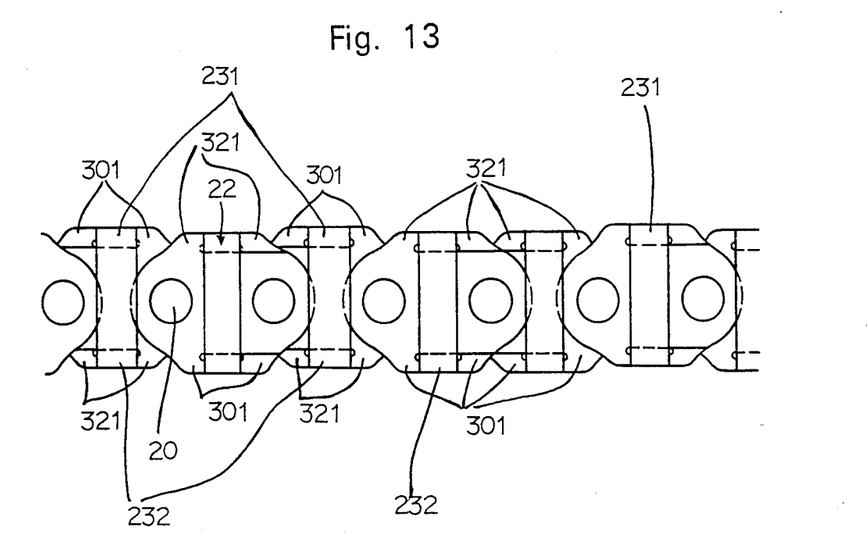
FIG. 13 is a side view of a portion of the V-shape belt of the second embodiment.
Figure 14:
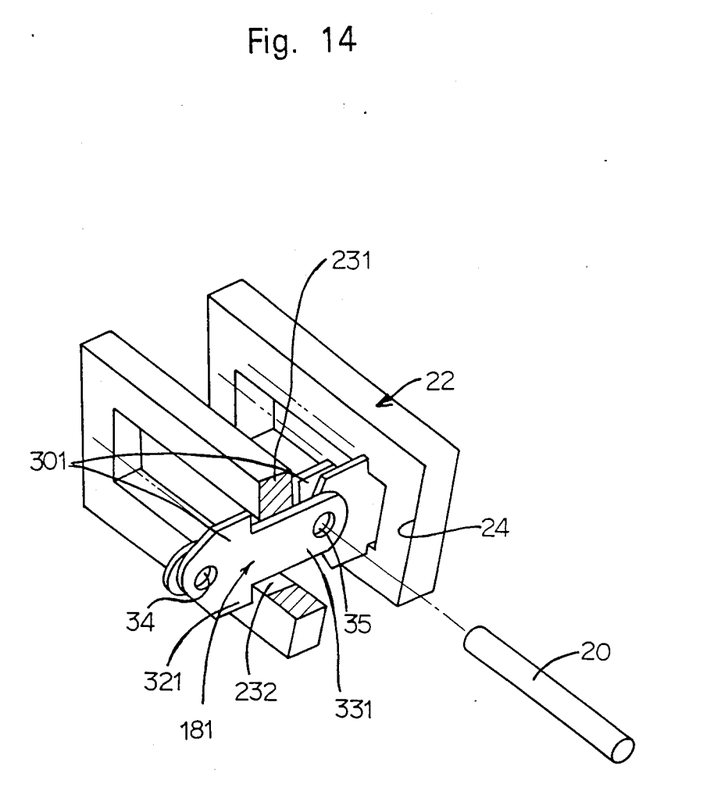
FIG. 14 is a perspective view of a portion of the V-shape belt of the second embodiment.

FIGS. 12 through 14 show a second embodiment of the present invention.

The second embodiment is similar to the first embodiment mentioned above. However, the second embodiment includes a different shaped link 181. The link 181 includes a third projection 301, a fourth projection 321, an intermediate portion 331, an outer contact surface 362 and an inner contact surface 372.

As shown in FIG. 14, in the assembled condition, the third and fourth projection 301 and 321 engage respectively with the front and rear surfaces of the outer and inner beams 231 and 232. The outer and inner contact surfaces 362 and 372 contact with the inner surfaces 241 and 242 of the opening 24 of the V-shape block 22.

In a similar manner to the first embodiment, a pitch line P—P is parallel to the center line X—X of the link 181, and the pitch line P—P is separated from the center line X—X by a distance "δ".

Accordingly, a third distance "a" between the third contact surface 362 and the pitch line P—P is shorter than a fourth distance "b" between the fourth contact surface 372 and the pitch line P—P by a distance "2δ".

When assembled, some of the block means have the third projections 301 and some have the fourth projections 301 and 321 facing the outer side of the loop, and some of the third and fourth projections 301 and 321 face to the inside of the loop. The block means are arranged at random with respect to the facing directions of the projections.

As a result, when the V-shape belt 100 is rotated, the radial distances of the engagements between the V-shape blocks 22 and the V-shape belt 100 and the pulleys 906 and 907 vary randomly. Consequently, time periods, defined between the engagement and the next engagement of the V-shape block 22 of the V-shape belt 100 with the pulleys 906 and 907, is varied, (i.e., the frequency of the noise caused by the engagement is not concentrated at a constant frequency and the frequency of the noise is leveled). Thus, the noise is reduced.

As described herein, the present invention overcomes the shortcomings of the known art by providing a V-shape belt which reduces noise caused by engagements of the V-shape blocks of the V-shape belt with the pulleys.

While the present invention has been described in its preferred embodiments, it is to be understood that the invention is not limited thereto, and may be otherwise embodied within the scope of the following claims.

What is claimed is:

1. A continuous belt of a continuously variable transmission for transmitting a driving torque from an input pulley to an output pulley, comprising:

a plurality of block means, each block means including an opening, a contacting point and at least a beam, whereby when the continuous belt spans between the input and output pulleys, the contacting point contacts with one of the input and output pulleys;

a plurality of link means associated with each block means, each link means including first and second end portions, an intermediate portion, first and second connecting holes, a first projection and a second projection, the intermediate portion being defined between the first and second end portions, said first and second connecting holes being defined respectively within said first and second end portions, the first projection projecting from one of said end portions toward a lateral direction of the continuous belt, the second projection projecting from said one of said end portions in a direction opposite the direction of the first projection, the intermediate portion of each of said plurality of links being inserted into the opening of the associated block means, at least one of the first and second projections engaging with the beam of the block means, each link means having a pitch line of the link means passing through center points of said first and second connecting holes, and a center line of the link means passing equidistant from the first and second projections, the pitch line being parallel to and spaced apart from the center line, wherein some of said block means and plurality of link means are configured such that said first projections of said link means and link means are directed inside the continuous belt, and the remainder of said block means and link means are configured such that said second projections of said link means are directed inside of the continuous belt; and pin menas cooperating with said first and second connecting holes to rotatably connect adjacent ones of said plurality of link means, thereby connecting adjacent block means to define the continuous belt, said block means being arranged at random such that the block means having inward facing first and second projections, respectively, vary randomly.

2. The continuous belt of claim 1, wherein each said block means includes first and second side surfaces which contact with inner grooves of the input and output pulleys when the continuous belt spans between the input and output pulleys.

3. The continuous belt of claim 1, wherein the first projection of each link means projects from said one of said end portions by the same distance as the second projection projects from said one of said end portions.

4. The continuous belt of claim 3, wherein the link means includes a third projection which projects in the same direction as the first projection.

5. The continuous belt of claim 4, wherein a first recess is defined between the first and third projections of each link means, the beam of the block means being inserted into the first recess of each link means.

6. The continuous belt of claim 3, wherein the link means includes a fourth projection which projects in the same direction as the second projection.

7. The continuous belt of claim 6, wherein a second recess is defined between the second and fourth projections of each link means, the beam of the block means being inserted into the second recess of each link means.

8. A continuous belt of a continuously variable transmission for transmitting a driving torque from an input pulley to an output pulley, comprising:
a plurality of block means, a plurality of link means and a plurality of pin means;
each block means including an engagement point, whereby when the continuous belt spans between the input and output pulleys, at least two engagement points are defined between at least two block means and the pulleys;
each link means being associated with one of said block means and including first and second end portions, first and second connecting holes, first and second projections, said first and second connecting holes being respectively defined within said first and second end portions, the first projection projecting from the first end portion toward a lateral direction of the continuous belt, the second projection projecting from the first end portion in a direction opposite the direction of the first projection, a pitch line of the link means passing through center points of the first and second connecting holes, a center line of the link passing equidistant from the first and second projections, the pitch line being parallel to and spaced apart from the center line, the first projection of the link means being positioned toward the inside of the continuous belt in one of said at least two engagement points, the second projection of the link means being positioned toward the inside of the continuous belt in the other of said at least two engagement points; and
said pin means cooperating with said connecting holes to connect adjacent ones of said link means, thereby connecting adjacent block means to define the continuous belt.

9. The continuous belt of claim 8, wherein the first projection of each link means projects from the first end portion by the same distance as the second projection projects from the first end portion.

10. The continuous belt of claim 9, wherein the link means includes a third projection which projects in the same direction as the first projection.

11. The continuous belt of claim 10, wherein a first recess is defined between the first and third projections of each link means, a beam of the block means being inserted into the first recess of each link means.

12. The continuous belt of claim 9, wherein the link means includes a fourth projection which projects in the same direction as the second projection.

13. The continuous belt of claim 12, wherein a second recess is defined between the second and fourth projections of each link means, a beam of the block means being inserted into the second recess of each link means.

14. A continuous belt of a continuously variable transmission for transmitting a driving torque from an input pulley to an output pulley, comprising:
a plurality of block means, a plurality of link means and a plurality of pin means;
each block means including an engagement surface, whereby when the continuous belt spans between the input and output pulleys, at least two engagement points are defined between at least two block means and the pulleys;
each link means being associated with one of said block means and including first and second end portions, first and second connecting holes, first and second projections, said first and second connecting holes being respectively defined within said first and second end portions, the first projection projecting from the first end portion toward a lateral direction of the continuous belt, the second projection projecting from the first end portion in a direction opposite the direction against the first projection, a pitch line of the link means passing through center points of the first and second connecting holes, a center line of the link means passing equidistant from the first and second projections, the pitch line being parallel to and spaced apart from the center line, one of the first and second projections projecting from the pitch line more than the other one of the first and second projections, said first and second projections projecting perpendicular to the center line of the link means, the first projection of the link means being positioned toward the inside of the continuous belt in one of said at least two engagement points, the second projection of the link means being positioned toward the inside of the continuous belt in the other of said at least two engagement points, whereby when the continuous belt spans between the input and output pulleys, one of said at least two engagement points projects toward the inside of the continuous belt more than the other one of said at least two engagement points; and
pin means cooperating with said connecting holes to connect adjacent ones of said links, thereby connecting adjacent block means to define the continuous belt.

15. The continuous belt of claim 14, wherein a first radial distance defined between one of said at least two engagement points and a center point of the pulley is shorter than a second radial distance defined between the other of said at least two engagement points and the center point of the pulley.

16. The continuous belt of claim 15, wherein the first projection of the link means projects from the first end portion by the same distance as the second projection projects from the first end portion.

17. The continuous belt of claim 16, wherein the link means includes a fourth projection which projects in the same direction as the second projection.

18. The continuous belt of claim 17, wherein a second recess is defined between the second and fourth projections of each link means, a beam of the block means being inserted into the second recess of each link means.

19. The continous belt of claim 16, wherein the link means includes a third projection which projects in same direction as the first projection.

20. The continuous belt of claim 19, wherein a first recess is defined between the first and third projections of each link means, a beam of the block means being inserted into the first recess of each link means.

* * * * *